(12) United States Patent
Chen

(10) Patent No.: US 6,186,598 B1
(45) Date of Patent: Feb. 13, 2001

(54) BICYCLE WHEEL RIM WITH A RIM BODY HAVING AN H-SHAPED CROSS-SECTION

(75) Inventor: Chao-Ying Chen, Tainan Hsien (TW)

(73) Assignee: Alex Machine Industrial Co., Ltd., Tainan Hsien (TW)

( * ) Notice: Under 35 U.S.C. 154(b), the term of this patent shall be extended for 0 days.

(21) Appl. No.: 09/415,553

(22) Filed: Oct. 8, 1999

(51) Int. Cl.$^7$ ............................................. B60B 1/14
(52) U.S. Cl. ................................................ 301/58; 301/95
(58) Field of Search ............................ 301/58, 95, 96, 301/97, 98

(56) References Cited

U.S. PATENT DOCUMENTS

| 365,091 | * | 4/1887 | Owen | 301/58 X |
| 5,499,864 | * | 3/1996 | Klein et al. | 301/58 X |
| 5,651,591 | * | 7/1997 | Mercat et al. | 301/58 X |
| 5,653,510 | * | 8/1997 | Osborne | 301/95 |

FOREIGN PATENT DOCUMENTS

| 1289921 | * | 5/1961 | (FR) | 301/58 |
| 2351803 | * | 7/1975 | (FR) | 301/97 |

* cited by examiner

Primary Examiner—Russell D. Stormer
(74) Attorney, Agent, or Firm—Ohlandt, Greeley, Ruggiero & Perle, L.L.P.

(57) ABSTRACT

A bicycle wheel rim includes a unitary integrally formed rim body which has annular left and right tire retaining walls that are spaced apart from each other, and an annular bridging portion. Each of the tire retaining walls has a radial inner section proximate to a central point of the wheel rim, a radial outer section distal to the central point of the wheel rim, and an intermediate section between the radial inner and radial outer sections. The radial outer sections of the tire retaining walls are adapted for retaining a bicycle tire therebetween. The bridging portion interconnects the intermediate sections of the tire retaining walls, and cooperates with the tire retaining walls to provide the rim body with a generally H-shaped cross-section.

7 Claims, 9 Drawing Sheets

BICYCLE WHEEL RIM WITH A RIM BODY HAVING AN H-SHAPED CROSS-SECTION

BACKGROUND OF THE INVENTION

1. Field of the Invention

This invention relates to a bicycle wheel rim, more particularly to a bicycle wheel rim which has an enhanced strength to resist impact applied on tire retaining walls thereof and which can be made using a simplified manufacturing process.

2. Description of the Related Art

A conventional bicycle wheel rim is generally produced by forming a metal strip, such as from extruded aluminum, cutting and bending the metal strip to form an annular shape with a predetermined size, and bonding two opposite end portions of the metal strip to form an annular frame. FIG. 1 illustrates the cross-section of the conventional bicycle wheel rim 1 which includes spaced left and right tire retaining walls 11, and an annular spoke mounting wall 12 interconnecting radial inner edges of the tire retaining walls 11. However, the bicycle wheel rim 1 does not have a sufficient strength, especially when it is used for a racing bicycle.

FIGS. 2 and 3 illustrate another conventional bicycle wheel rim 2 which includes left and right tire retaining walls 21 for retaining a bicycle tire 26 therebetween, a spoke mounting wall 22 interconnecting radial inner edges of the tire retaining walls 21, and a reinforcing wall 23 interconnecting the tire retaining walls 21 and disposed radially and outwardly of the spoke mounting wall 22. The spoke mounting wall 22 is formed with a plurality of spoke mounting holes 221 for mounting spoke fasteners 244 thereon. The reinforcing wall 23 is formed with a plurality of through holes 231 which are larger than and which are aligned with the spoke mounting holes 221, respectively, to permit extension of the spoke fasteners 244 therethrough. To mount spokes 243 on the wheel rim 2, a plurality of sockets 25 are required. The sockets 25 are disposed in the wheel rim 2 between the through holes 231 and the spoke mounting holes 221 to guide insertion of the spoke fasteners 244 into the spoke mounting holes 221. A bicycle tire 26 is then installed on the wheel rim 2 by retention between the tire retaining walls 21. Since the reinforcing wall 23 is formed with through holes 231, the bicycle tire 26 generally includes an inflatable inner tire body 261 and an outer tire member 262 enclosing the inner tire body 261. In order to protect the inner tire body 261 from being damaged by peripheries of the through holes 231, a lining 263 is provided around the reinforcing wall 23 for lining the inner tire body 261.

Although the wheel rim 2 is provided with a reinforcing wall 23 to result in an increased strength, the wheel rim 2 suffers from the following drawbacks:

(1) During manufacture, through holes 231 and spoke mounting holes 221 should be formed by punching the reinforcing wall 23 and the spoke mounting wall 22, respectively. Since the through holes 231 and the spoke mounting holes 221 have different sizes, the punching process is relatively complicated.

(2) During assembly, each of the sockets 25 is extended through an aligned pair of the through holes 231 and the spoke mounting holes 221. Then, each of the spoke fasteners 244 is extended into the sockets 25 and is retained therein for fastening a respective one of the spoke 243 thereon. The assembly procedure is both time and labor-consuming, and is uneconomical. Moreover, the sockets 25 must be formed to suit the sizes of the through holes 231 and the spoke mounting holes 221 and the distance between the same. Formation of the sockets 25 thus increases the manufacturing costs for the bicycle wheel rim 2.

SUMMARY OF THE INVENTION

Therefore, the object of the present invention is to provide a bicycle wheel rim which has an enhanced strength to resist impact applied on tire retaining walls thereof and which can be made using a simplified manufacturing process.

Accordingly, the bicycle wheel rim of the present invention includes a unitary integrally formed rim body which has annular left and right tire retaining walls that are spaced apart from each other, and an annular bridging portion. Each of the tire retaining walls has a radial inner section proximate to a central point of the wheel rim, a radial outer section distal to the central point of the wheel rim, and an intermediate section between the radial inner and radial outer sections. The radial outer sections of the tire retaining walls are adapted for retaining a bicycle tire therebetween. The bridging portion interconnects the intermediate sections of the tire retaining walls, and cooperates with the tire retaining walls to provide the rim body with a generally H-shaped cross-section.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
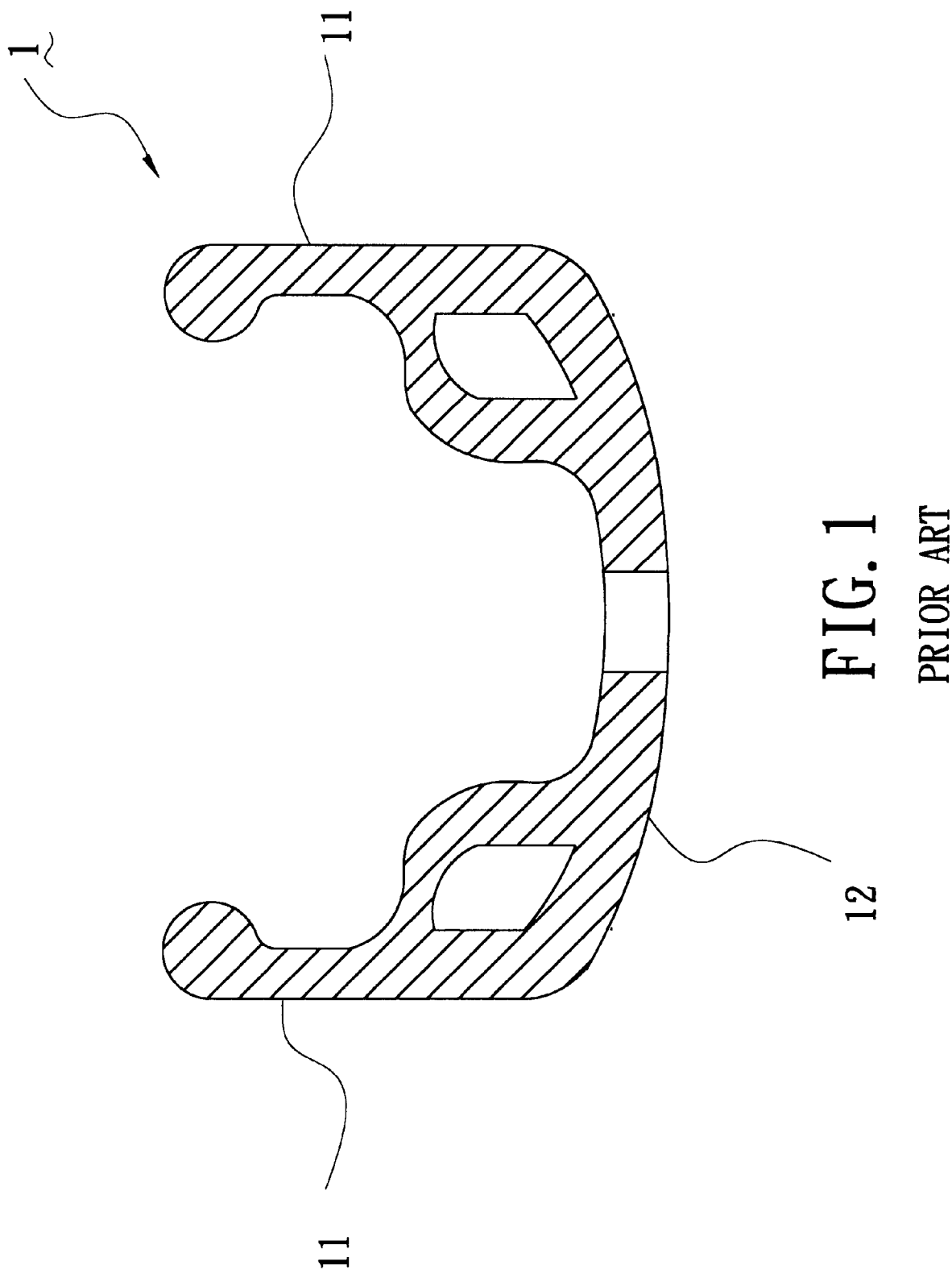
FIG. 1 is an enlarged fragmentary sectional view illustrating a conventional bicycle wheel rim.
Figure 2:
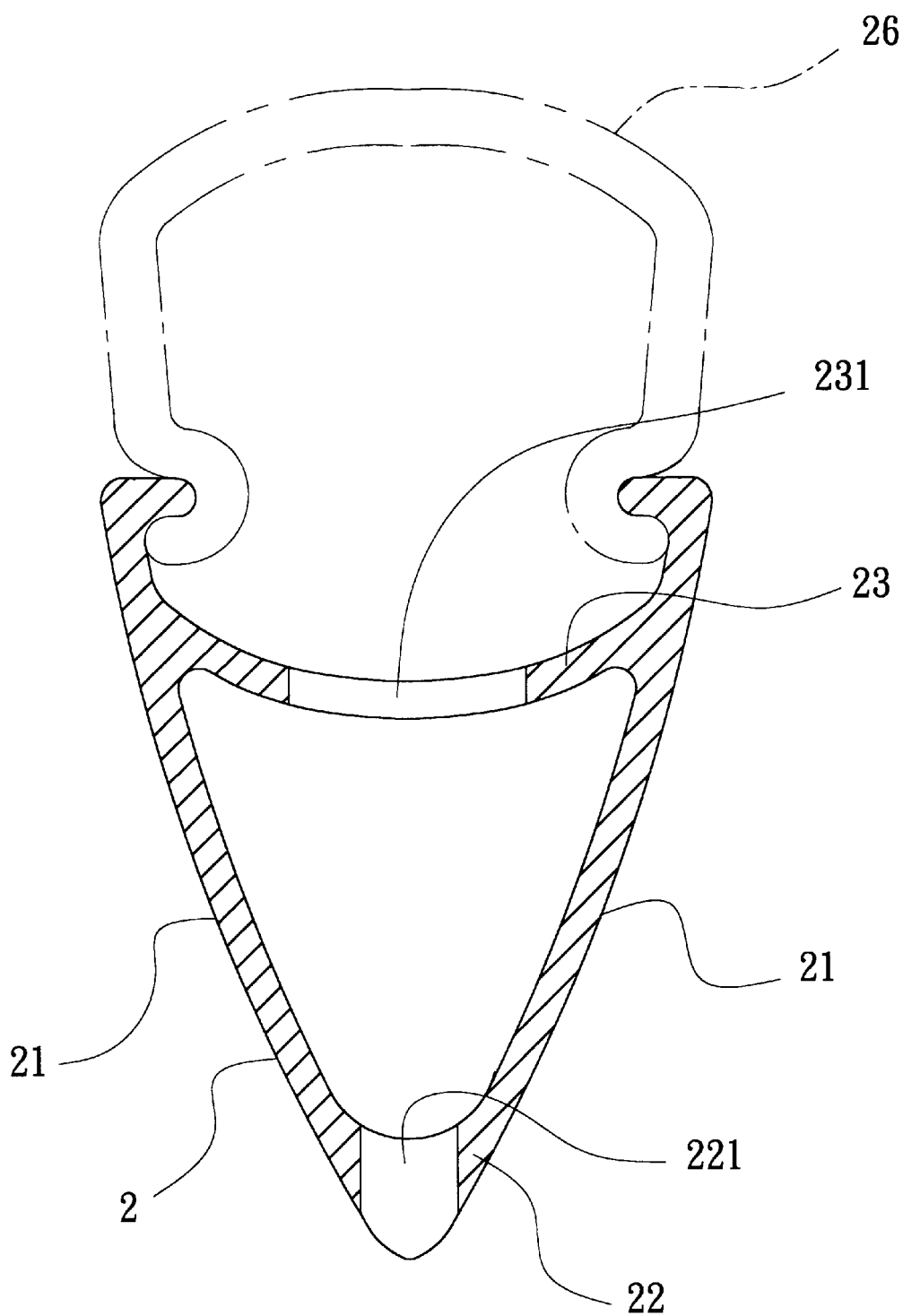
FIG. 2 is an enlarged fragmentary sectional view illustrating another conventional bicycle wheel rim.
Figure 3:
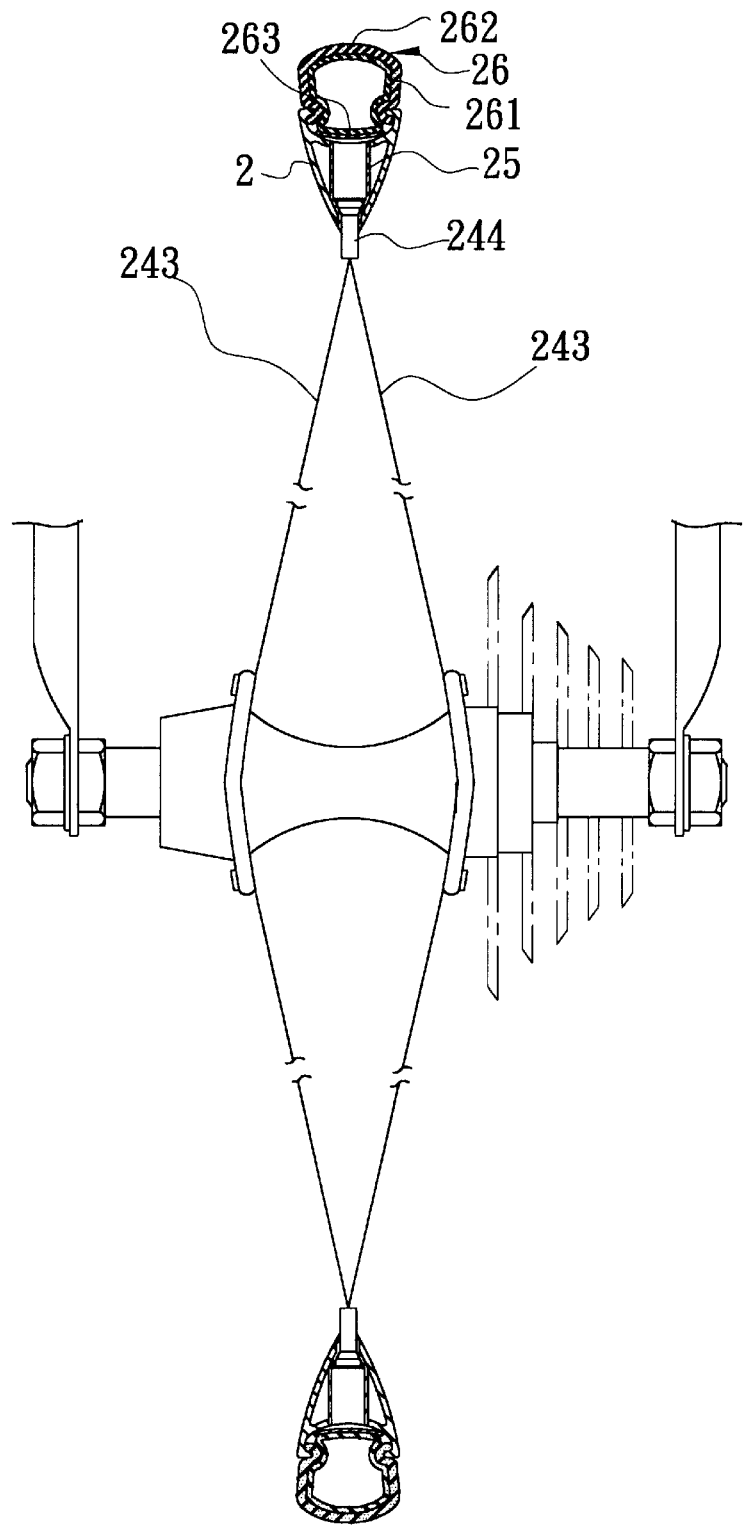
FIG. 3 is a schematic partly sectional view illustrating the bicycle wheel rim of FIG. 2 when mounted on a hub to form a bicycle wheel.
Figure 4:
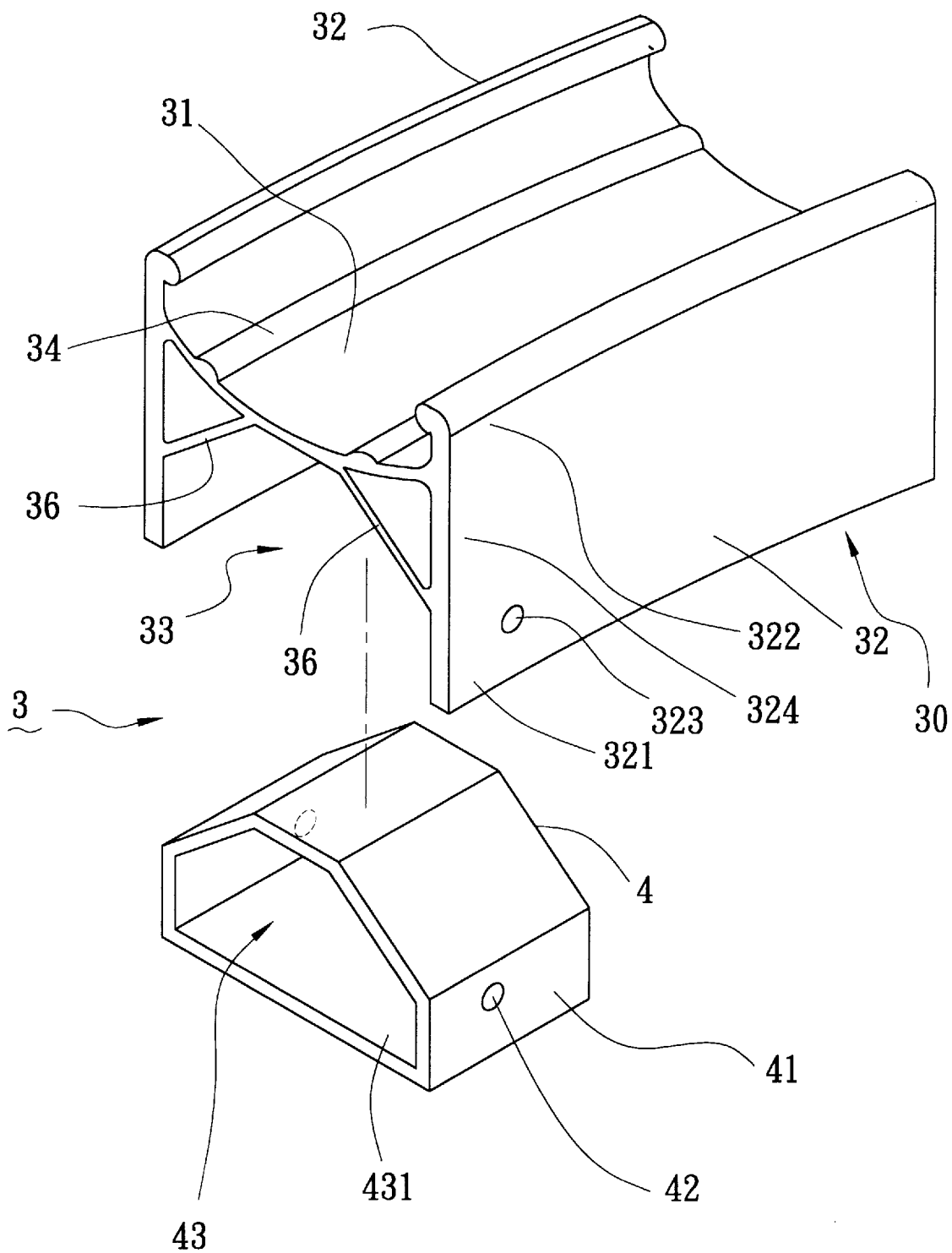
FIG. 4 is a fragmentary exploded perspective view illustrating a first preferred embodiment of a bicycle wheel rim of the present invention.
Figure 6:
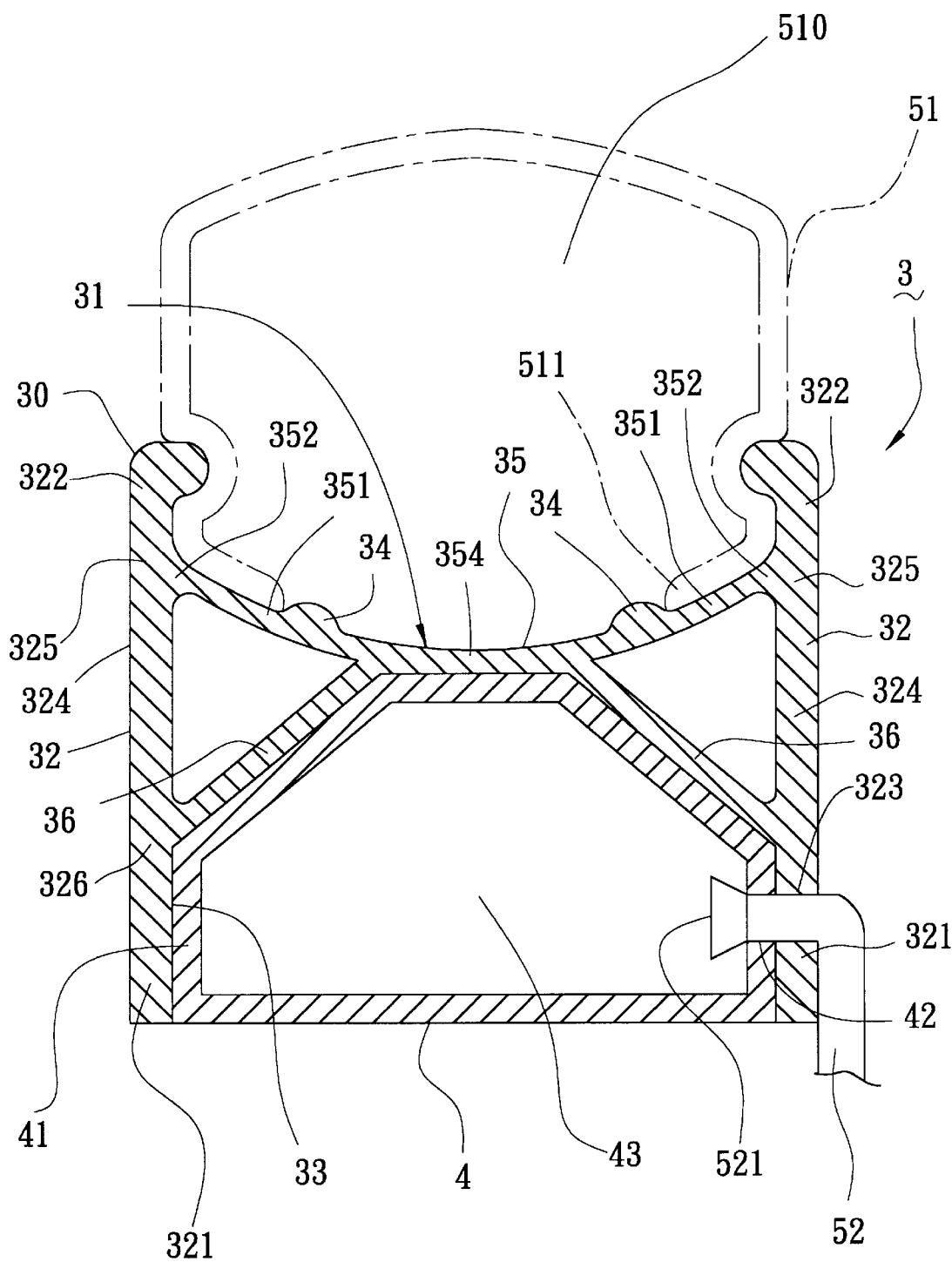
FIG. 6 is an enlarged fragmentary sectional view illustrating the first preferred embodiment.

Referring to FIGS. 4 and 6, the first preferred embodiment of the bicycle wheel rim 3 of the present invention is shown to include a unitary integrally formed annular rim body 30 and a plurality of hollow packing members 4 formed separately from the rim body 30.

The rim body 30 includes annular left and right tire retaining walls 32 which are spaced apart from each other.

Each of the tire retaining walls 32 has a radial inner section 321 proximate to a central point of the wheel rim 3, a radial outer section 322 distal to the central point of the wheel rim 3, and an intermediate section 324 between the radial inner and radial outer sections 321, 322. The radial outer sections 322 of the tire retaining walls 32 are adapted for retaining a bicycle tire 51 therebetween. The radial outer section 322 of each of the tire retaining walls 32 has a radial inner end 325 connected to the intermediate section 324. The radial inner section 321 of each of the tire retaining walls 32 has a radial outer end 326 connected to the intermediate section 324, and is formed with a plurality of spoke mounting holes 323 that extend through two opposite lateral surfaces of the radial inner section 321 and that are arranged along the length of the rim body 30.

The rim body 30 further includes an annular bridging portion 31 which interconnects the intermediate sections 324 of the tire retaining walls 32. The bridging portion 31 includes an annular connecting wall 35, and left and right reinforcing walls 36. The connecting wall 35 has left and right wall parts 351 with left and right terminating edges 352 connected to the radial inner ends 325 of the radial outer sections 322 of the left and right tire retaining walls 32, respectively, and an intermediate wall part 354 interconnecting the left and right wall parts 351. Each of the left and right reinforcing walls 36 extends from the radial outer end 326 of the radial inner section 321 of a respective one of the left and right tire retaining walls 32 to the intermediate wall part 354 of the connecting wall 35. Each of the left and right wall parts 351 is formed with a limiting rib 34 on a radial outer surface of the connecting wall 35 that is opposite to the central point of the wheel rim 3. The limiting ribs 34 extend along the length of the rim body 30.

As shown, the radial inner sections 321 of the tire retaining walls 32 project radially and inwardly with respect to the bridging portion 31, while the radial outer sections 322 project radially and outwardly with respect to the bridging portion 31. The bridging portion 31 and the left and right tire retaining walls 32 cooperatively provide the rim body 30 with a generally H-shaped cross-section. The bridging portion 31 and the radial inner sections 321 of the tire retaining walls 32 thus define a receiving space 33 that opens in a radial inward direction.

The packing members 4 are received fittingly in the receiving space 33. Each of the packing members 4 has a polygonal cross-section, and left and right side walls 41 which abut against the radial inner sections 321 of the left and right tire retaining walls 32, respectively. Each of the side walls 41 is formed with a through hole 42 that is aligned with a respective one of the spoke mounting holes 323 in the adjacent tire retaining wall 32. Each of the packing members 4 has an open end 431 for access to an interior 43 of the packing member 4 and to the through holes 42 and the spoke mounting holes 323 from between the side walls 41.

Figure 5:
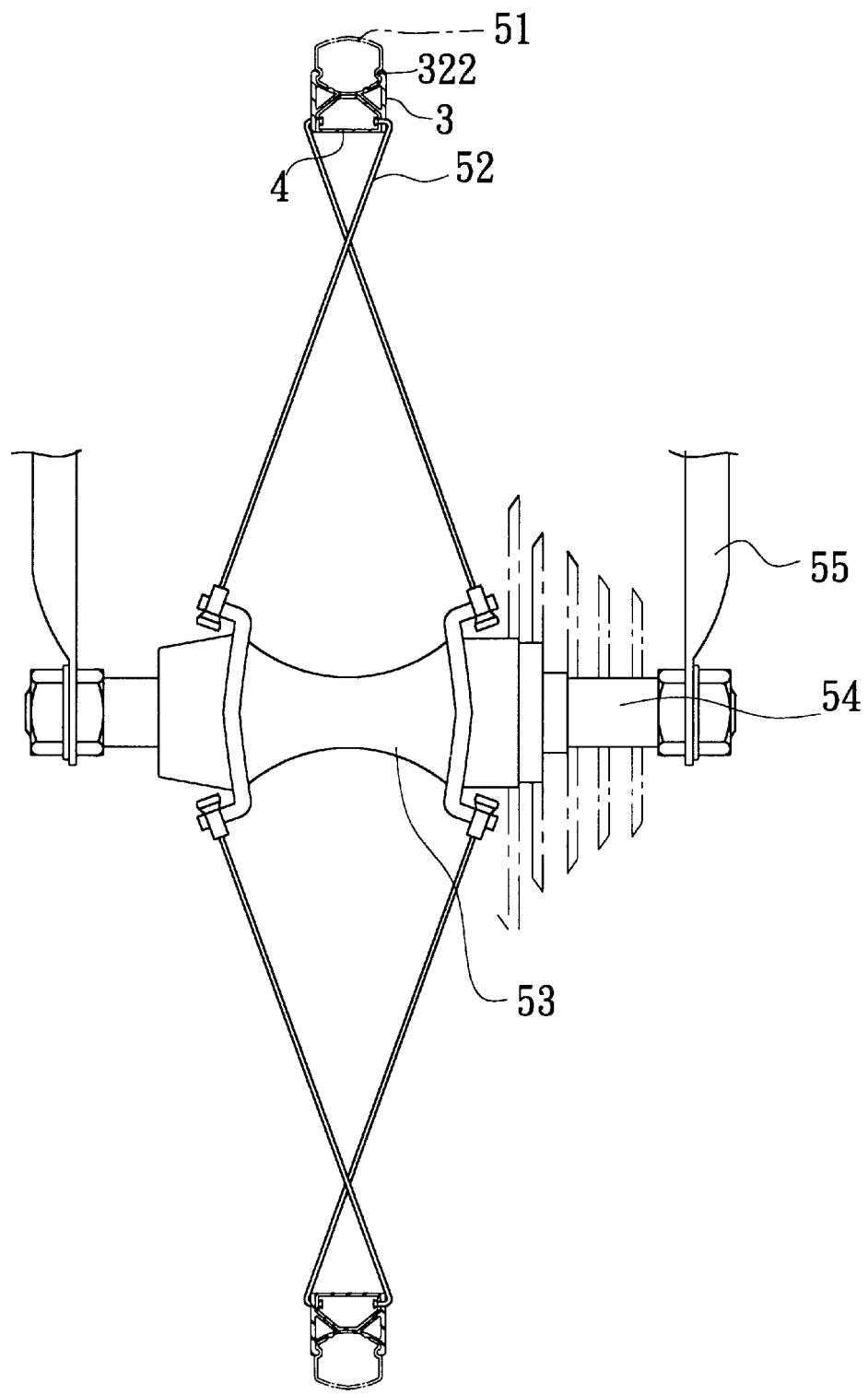
FIG. 5 is a schematic partly sectional view illustrating the first preferred embodiment when mounted on a hub to form a bicycle wheel.

Referring to FIGS. 5 and 6, in use, the bicycle tire 51 is installed on the bicycle wheel rim 3 so as to be retained between the radial outer sections 322 of the tire retaining walls 32. The bicycle tire 51 is in the form of an outer tire member, and has opposite terminating edges 511 which abut against the limiting ribs 34 formed on the bridging portion 31. A plurality of spokes 52 are extended through a respective one of the aligned pairs of the through holes 42 and the spoke mounting holes 323 for mounting the wheel rim 3 to a hub 53. The spokes 52 are extended from the open end 431 of the interior 43 between the side walls 41 of the packing members 4, and have enlarged head portions 521 for retention on the wheel rim 3. The hub 53 is then installed on a front/rear fork 55 of a bicycle frame by means of an axle 54.

Since the spoke mounting holes 323 are formed in the radial inner sections 321 of the tire retaining walls 32, instead of being formed in the bridging portion 31, it is unnecessary to provide an inner tire body. After the bicycle tire 51 is mounted on the bicycle wheel rim 3, an air-tight air receiving chamber 510 is formed among the radial outer sections 322 of the tire retaining walls 32, the bridging portion 31, and the bicycle tire 51.

Figure 7:
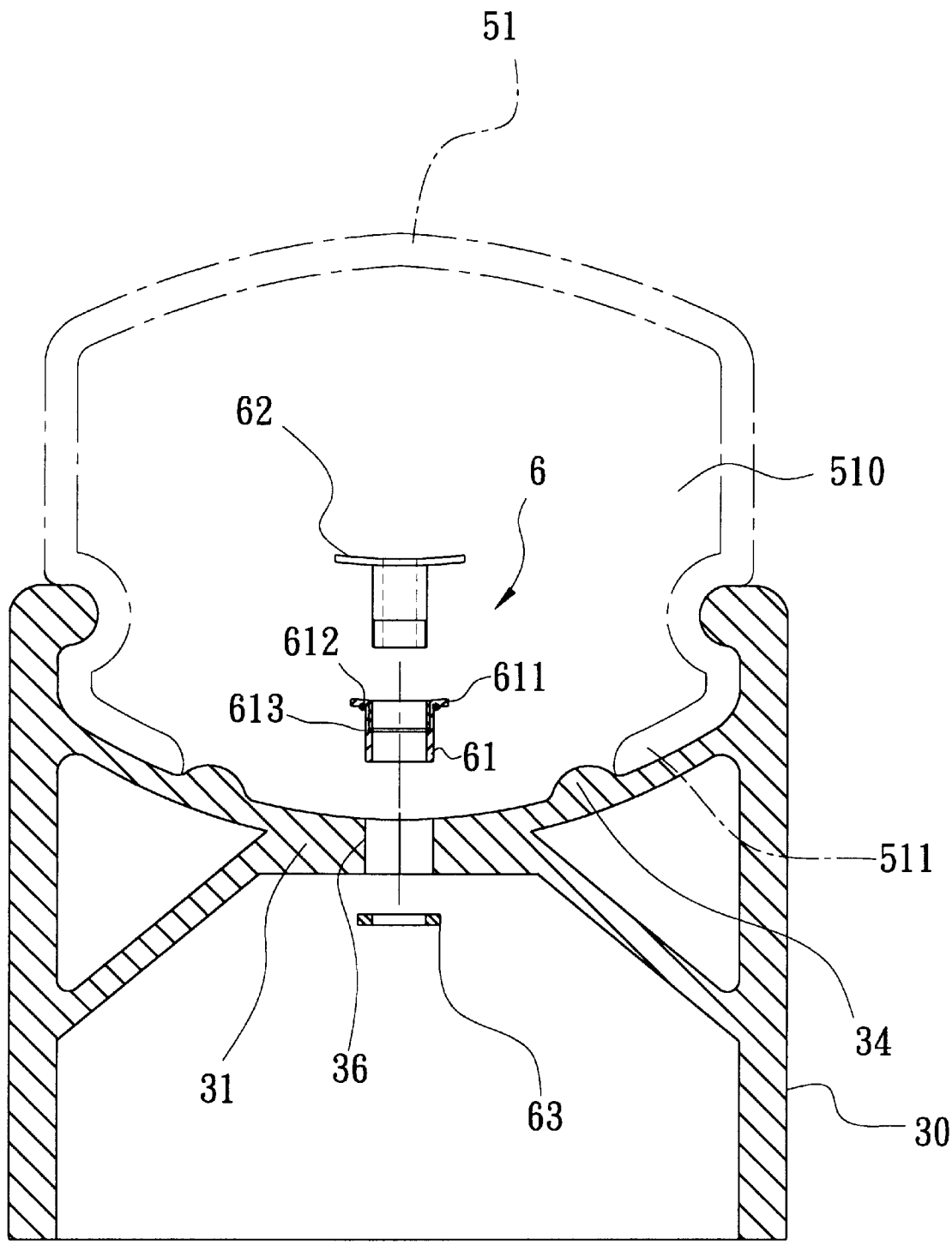
FIG. 7 is another enlarged fragmentary sectional view of the first preferred embodiment.

Referring to FIG. 7, in order to mount a valve unit 6 on the rim body 30 for inflating the air receiving chamber 510, a valve mounting hole 36 is formed through the bridging portion 31. The valve unit 6 includes a tubular sleeve 61 which extends through the valve mounting hole 36 and which has one end formed with an annular flange 611 that is seated on the bridging portion 31. The sleeve 61 is provided with an O-shaped outer sealing ring 612 on an outer surface of the sleeve 61 adjacent to the annular flange 611, and an O-shaped inner sealing ring 613 on an inner surface of the sleeve 61. A conventional inflating valve member 62 is extended through the sleeve 61, and is retained on the bridging portion 31 by means of a nut 63 that engages one end of the valve member 62. In the case air leaks out of the air receiving chamber 510, such as when the tire 51 is pierced by a nail, the limiting ribs 34 prevent the terminating edges 511 of the bicycle tire 51 from moving toward each other in order to prevent exposing of the valve unit 6.

Figure 8:
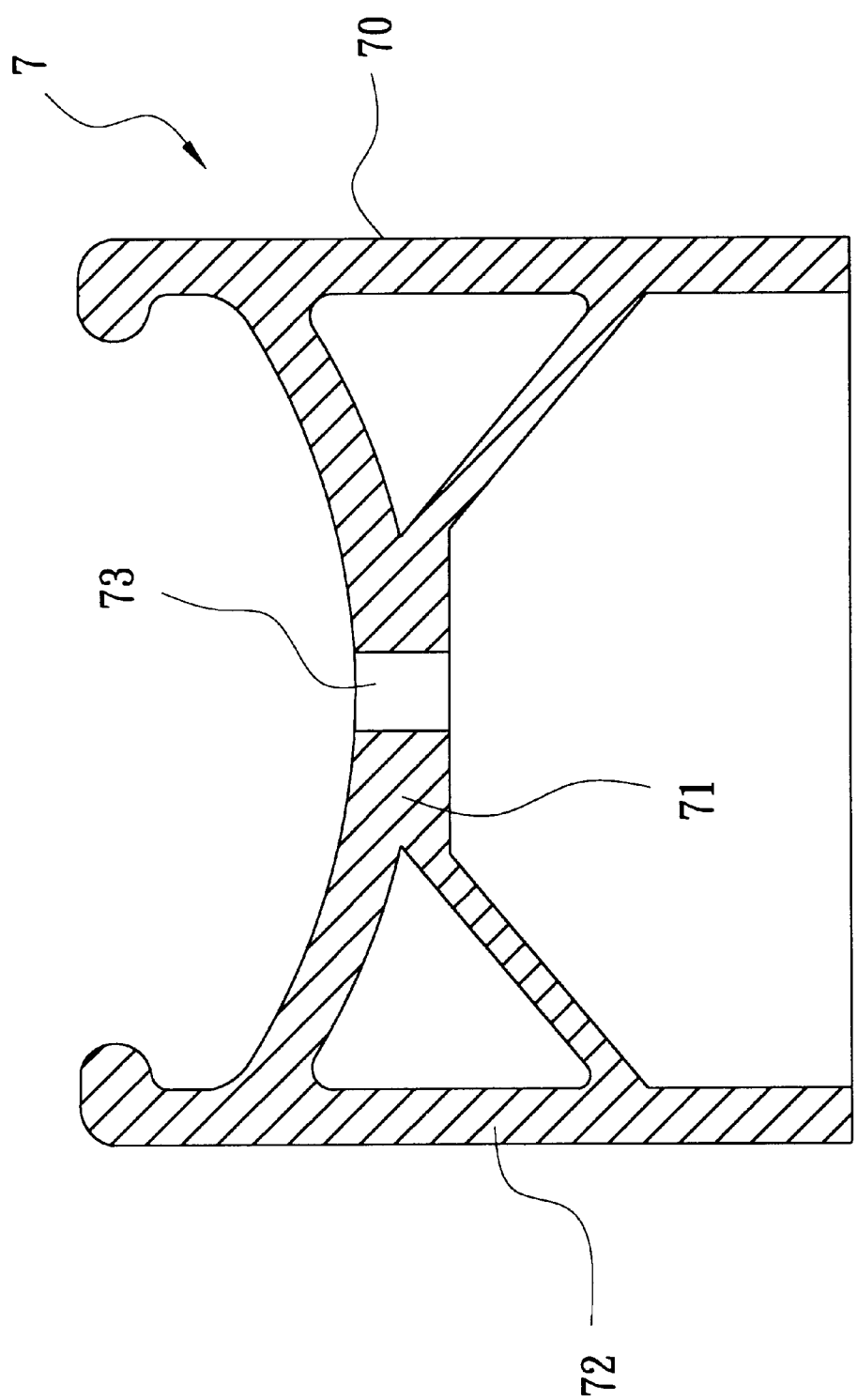
FIG. 8 is an enlarged fragmentary sectional view illustrating a second preferred embodiment of the bicycle wheel rim of the present invention.

Referring to FIG. 8, the second preferred embodiment of the wheel rim 7 of the present invention is shown to include a unitary integrally formed rim body 70 having left and right tire retaining walls 72 and a bridging portion 71 interconnecting intermediate sections of the tire retaining walls 72. The rim body 70 is different from the rim body 30 of the previous embodiment in that the spoke mounting holes 73 are formed radially through an intermediate wall part of the bridging portion 71.

Figure 9:
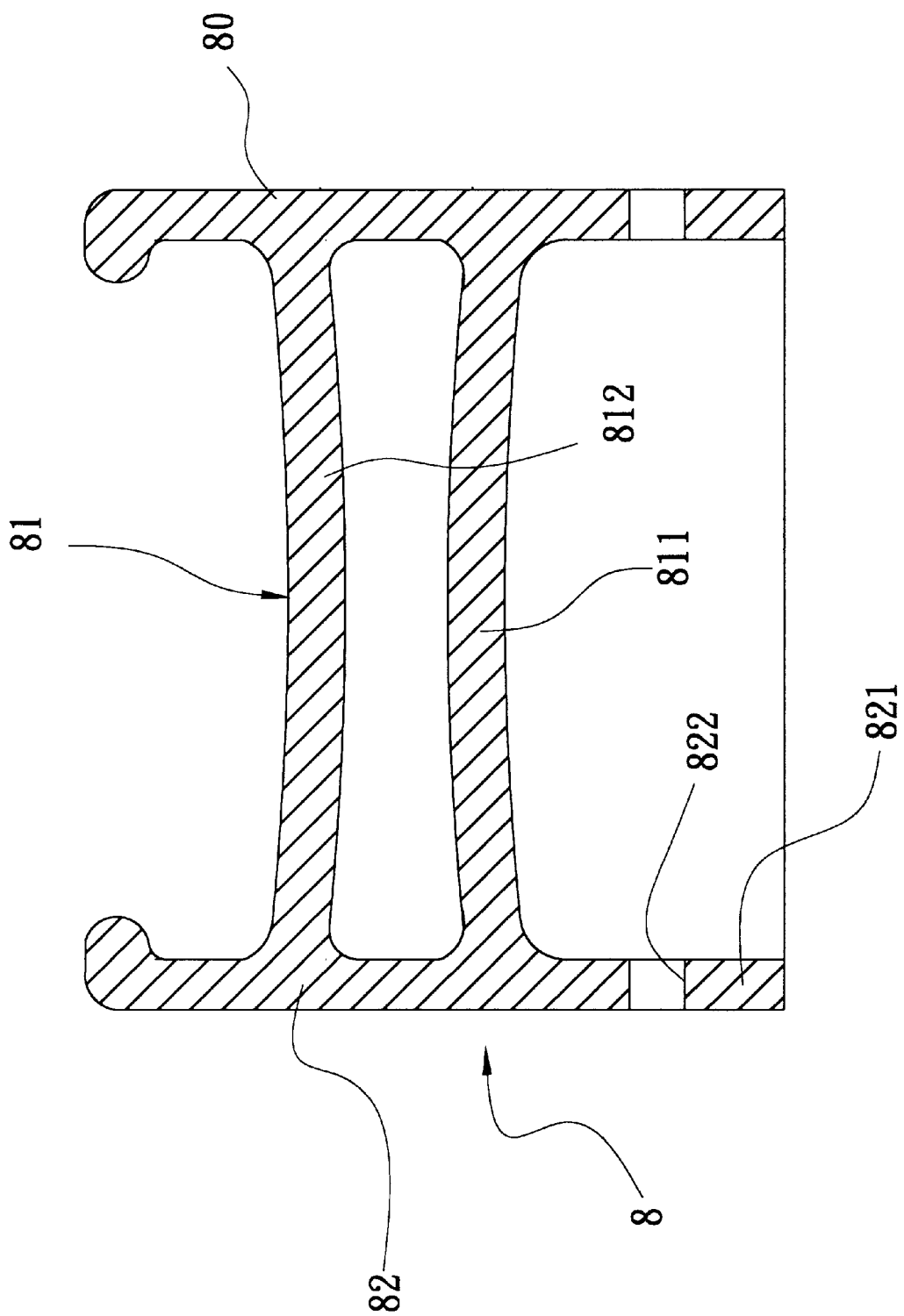
FIG. 9 is an enlarged fragmentary sectional view illustrating a third preferred embodiment of the bicycle wheel rim of the present invention.

Referring to FIG. 9, the third preferred embodiment of the bicycle wheel rim 8 of the present invention is shown to include a unitary integrally formed rim body 80 having left and right tire retaining walls 82 and a bridging portion 81 interconnecting intermediate sections of the tire retaining walls 82. The bridging portion 81 includes annular inner and outer connecting walls 811, 812 which extend between the intermediate sections of the tire retaining walls 82. The outer connecting wall 812 is disposed radially and outwardly of the inner connecting wall 811. The tire retaining walls 82 have radial inner sections 821 formed with spoke mounting holes 822.

The present invention provides the following advantages:

(1) With a generally H-shaped cross-section, the rim body 30, 70, 80 of the wheel rim 3, 7, 8 of the present invention has an enhanced strength to resist impact applied from lateral sides thereof. As such, an additional reinforcing wall interconnecting the tire retaining walls might be unnecessary in the event that it is desired to provide the bicycle wheel with a relatively light weight.

(2) In the embodiments shown in FIGS. 4 and 9, the spoke mounting holes 323, 822 are formed in the radial inner sections 321, 821 of the tire retaining walls 32, 82. In the embodiment shown in FIG. 8, only one set of spoke mounting holes 73 with a single size are formed in the bridging portion 71. The punching process for forming the spoke mounting holes 323, 822, 73 is easier to conduct, thereby simplifying the manufacturing process.

(3) In the embodiments shown in FIGS. 4 and 9, since the spoke mounting holes 323, 822 are formed in the radial inner sections 321, 821 of the tire retaining walls 32, 82, an inner tire body is unnecessary, and a liner for lining the inner tire body is also unnecessary. The manufacturing cost is thus reduced.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim for mounting a plurality of spokes thereon, comprising a unitary integrally formed rim body which includes:

annular left and right tire retaining walls which are spaced apart from each other, each of said tire retaining walls having a radial inner section proximate to a central point of said wheel rim, a radial outer section distal to the central point of said wheel rim, and an intermediate section between the central point of said wheel rim, and an intermediate section between said radial inner and radial outer sections, said radial outer sections of said tire retaining walls being adapted for retaining a bicycle tire therebetween, and an annular bridging portion interconnecting said intermediate sections of said tire retaining walls, said bridging portion and said tire retaining walls cooperatively providing said rim body with a generally H-shaped cross-section, wherein said radial inner section of each of said tire retaining walls has two opposite lateral surfaces, and is formed within a plurality of spoke mounting holes that extend through said lateral surfaces and that are arranged along a length of said rim body so as to be adapted for mounting the spokes thereon.

2. The bicycle wheel rim according to claim 1, wherein said radial outer sections of said tire retaining walls have radial inner ends connected to said intermediate sections, said radial inner sections of said tire retaining walls having radial outer ends connected to said intermediate sections, said bridging portion of said rim body including an annular connecting wall which has a left wall part with a left terminating edge connected to said radial inner end of said radial outer section of said left tire retaining wall, a right wall part with a right terminating edge connected to said radial inner end of said radial outer section of said right tire retaining wall, and an intermediate wall part interconnecting said left and right wall parts, a left reinforcing wall extending from said radial outer end of said radial inner section of said left tire retaining wall to said intermediate wall part of said connecting wall, and a right reinforcing wall extending from said radial outer end of said radial inner section of said right tire retaining wall to said intermediate wall part of said connecting wall.

3. The bicycle wheel rim according to claim 2, wherein said connecting wall has a radial outer surface opposite to the central point of the wheel rim, said radial outer surface being formed with spaced left and right ribs which extend along length of said connecting wall.

4. The bicycle wheel rim according to claim 1, further comprising a plurality of hollow packing members formed separately from said rim body, said packing members being disposed between said radial inner sections of said tire retaining walls, each of said packing members having a left side wall disposed adjacent to said radial inner section of said left tire retaining wall and formed with a left through hole that is aligned with a respective one of said spoke mounting holes in said left tire retaining wall, and a right sidewall disposed adjacent to said radial inner section of said right tire retaining wall and formed with a right through hole that is aligned with a respective one of said spoke mounting holes in said right tire retaining wall, each of said packing members having an open end for access to said through holes from between said side walls.

5. The bicycle wheel rim according to claim 4, wherein each of said packing members has a polygonal cross-section, and is fittingly disposed among said radial inner sections of said tire retaining walls and said bridging portion of said rim body.

6. A bicycle wheel rim for mounting a plurality of spokes thereon, comprising a unitary integrally formed rim body which includes:

annular left and right tire retaining walls which are spaced apart from each other, each of said tire retaining walls having a radial inner section proximate to a central point of said wheel rim, a radial outer section distal to the central point of said wheel rim, and an intermediate section between said radial inner and radial outer sections, said radial outer sections of said tire retaining walls being adapted for retaining a bicycle tire therebetween, and an annular bridging portion interconnecting said intermediate sections of said tire retaining walls, said bridging portion and said tire retaining walls cooperatively providing said rim body with a generally H-shaped cross-section, said radial outer sections of said tire retaining walls having radial inner ends connected to said intermediate sections, said radial inner sections of said tire retaining walls having radial outer ends connected to said intermediate sections, said bridging portion of said rim body including an annular connecting wall which has a left wall part with a left terminating edge connected to said radial inner end of said radial outer section of said left tire retaining wall, a right wall part with a right terminating edge connected to said radial inner end of said radial outer section of said right tire retaining wall, and an intermediate wall part interconnecting said left and right wall parts, a left reinforcing wall extending from said radial outer end of said radial inner section of said left tire retaining wall to said intermediate wall part of said connecting wall, a right reinforcing wall extending from said radial outer end of said radial inner section of said right tire retaining wall to said intermediate wall part of said connecting wall, wherein said intermediate wall part of said connecting w all of said bridging portion is formed with a plurality of radial spoke mounting holes adapted for mounting the spokes thereon.

7. A bicycle wheel rim for mounting a plurality of spokes thereon, comprising a unitary integrally formed rim body which includes:

annular left and right tire retaining walls which are spaced apart from each other, each of said tire retaining walls having a radial inner section proximate to a central point of said wheel rim, a radial outer section distal to the central point of said wheel rim, and an intermediate section between said radial inner and radial outer sections, said radial outer sections of said tire retaining walls being adapted for retaining a bicycle tire therebetween, and an annular bridging portion interconnecting said intermediate sections of said tire retaining walls, said bridging portion and said tire retaining walls cooperatively providing said rim body with a generally H-shaped cross-section, said bridging portion of said rim body including annular inner and outer connecting walls which extend between said intermediate sections of said tire retaining walls, said outer connecting wall being disposed around said inner connecting wall, wherein said radial inner section of each of said tire retaining walls has two opposite lateral surfaces, and is formed within a plurality of spoke mounting holes that extend through said lateral surfaces and that are arranged along a length of said rim body so as to be adapted for mounting the spokes thereon.

* * * * *